(12) United States Patent
Hagita et al.

(10) Patent No.: US 9,791,196 B2
(45) Date of Patent: Oct. 17, 2017

(54) AIR CONDITIONING APPARATUS

(75) Inventors: Takayuki Hagita, Tokyo (JP);
Takayuki Takashige, Tokyo (JP);
Nobuya Nakagawa, Tokyo (JP);
Mikihiko Ishii, Tokyo (JP); Takeshi Hirano, Tokyo (JP); Koji Nakano, Tokyo (JP); Masayuki Ishikawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1076 days.

(21) Appl. No.: 13/512,442

(22) PCT Filed: Aug. 26, 2010

(86) PCT No.: PCT/JP2010/064464
§ 371 (c)(1),
(2), (4) Date: May 29, 2012

(87) PCT Pub. No.: WO2011/099190
PCT Pub. Date: Aug. 18, 2011

(65) Prior Publication Data
US 2012/0234030 A1   Sep. 20, 2012

(30) Foreign Application Priority Data
Feb. 15, 2010   (JP) .................. 2010-029988

(51) Int. Cl.
*F25B 49/02* (2006.01)
*F04B 35/04* (2006.01)
(Continued)

(52) U.S. Cl.
CPC ....... *F25B 49/025* (2013.01); *B60H 1/00792* (2013.01); *F04B 35/04* (2013.01);
(Continued)

(58) Field of Classification Search
CPC .... B60H 1/00792; F04B 35/04; F04B 49/065; F04B 2201/0801; F04B 2203/0209;
(Continued)

(56) References Cited

U.S. PATENT DOCUMENTS

| 2005/0217292 A1* | 10/2005 | Onishi | F25B 49/02 |
| | | | 62/197 |
| 2005/0247073 A1* | 11/2005 | Hikawa | F04B 49/065 |
| | | | 62/228.1 |

(Continued)

FOREIGN PATENT DOCUMENTS

| CN | 100432432 C | 11/2008 |
| CN | 101375059 A | 2/2009 |

(Continued)

OTHER PUBLICATIONS

JP2006-291878_Machine Translation.*

(Continued)

*Primary Examiner* — Frantz Jules
*Assistant Examiner* — Nelson Nieves
(74) *Attorney, Agent, or Firm* — Westerman, Hattori, Daniels & Adrian, LLP

(57) ABSTRACT

Provided is an air conditioning apparatus that is capable of suppressing increases in volume and cost of the apparatus and performing more suitable overheating protection. An electric compressor is an inverter-integrated electric compressor integrally including a compressor, an electric motor that drives the compressor, and an inverter including a temperature sensor that detects the temperature in the vicinity of a semiconductor switching device, wherein a controller estimates a discharge temperature of the compressor on the basis of a correlation of respective pressure loading characteristics for the detected temperature of the inverter, (Continued)

for the rotational speed of the compressor, and for the motive force of the compressor in a refrigerating cycle.

5 Claims, 12 Drawing Sheets

(51) Int. Cl.
  *F04B 49/06* (2006.01)
  *B60H 1/00* (2006.01)
(52) U.S. Cl.
  CPC .... *F04B 49/065* (2013.01); *F04B 2201/0801* (2013.01); *F04B 2203/0209* (2013.01); *F04B 2205/11* (2013.01); *F25B 2500/08* (2013.01); *F25B 2500/19* (2013.01); *F25B 2500/222* (2013.01); *F25B 2500/29* (2013.01); *F25B 2600/021* (2013.01); *F25B 2700/21152* (2013.01); *F25B 2700/21153* (2013.01); *F25B 2700/21154* (2013.01); *F25B 2700/21156* (2013.01)
(58) Field of Classification Search
  CPC ............... F04B 2205/11; F25B 49/025; F25B 2500/08; F25B 2500/19; F25B 2500/222; F25B 2500/29; F25B 2600/021; F25B 2700/21152; F25B 2700/21153; F25B 2700/21154; F25B 2700/21156
  See application file for complete search history.

(56) References Cited

U.S. PATENT DOCUMENTS

| | | | |
|---|---|---|---|
| 2007/0000262 A1* | 1/2007 | Ikegami et al. | 62/170 |
| 2009/0041598 A1 | 2/2009 | Saito et al. | |

FOREIGN PATENT DOCUMENTS

| | | |
|---|---|---|
| EP | 1978254 A1 | 10/2008 |
| WO | WO 2007086257 A1 * | 8/2007 |

OTHER PUBLICATIONS

Chinese Office Action dated Dec. 23, 2013, issued in corresponding Chinese Patent Application No. 201080054436.9; w/ English translation (23 pages).

Extended European Search Report dated Sep. 12, 2014, issued in corresponding European Patent Application No. 10845782.1 (8 pages).

Notice of Allowance dated Sep. 3, 2014, issued in corresponding Chinese Patent Application No. 201080054436.9 (2 pages) "The Notice of Allowance has been received".

International Search Report of PCT/JP2010/064464, mailing date of Nov. 30, 2010.

* cited by examiner

AIR CONDITIONING APPARATUS

TECHNICAL FIELD

The present invention relates to an air conditioning apparatus, and in particular, to an air conditioning apparatus that is capable of suppressing increases in volume and cost of the apparatus and that is capable of suitable overheating protection.

BACKGROUND ART

Known air conditioning apparatuses for vehicles, such as automobiles, include a compressor that compresses a gas refrigerant, a condenser that condenses high-pressure gas refrigerant by performing heat exchange with outside air, an expansion valve that expands high-temperature, high-pressure liquid refrigerant into low-temperature, low-pressure liquid refrigerant, and an evaporator that evaporates the low-temperature, low-pressure liquid refrigerant by performing heat exchange with outside air, and a refrigerating cycle is formed by connecting these constituent parts via refrigerant flow paths.

In vehicle air conditioning apparatuses of this type, in the case of a configuration using an electric compressor in which a compressor is driven by an electric motor, operation control is performed such that the discharge temperature of the compressor is detected and the rotational speed of the electric compressor is reduced to a set value when the discharge temperature is equal to or higher than a certain temperature. In addition, from the viewpoint of overheating protection, temperature detection means is provided in the vicinity of a motor coil of the electric motor, and control is also performed to reduce the rotational speed of the electric compressor or to stop the electric compressor when the motor coil temperature is higher than an allowable temperature.

As described above, in order to detect the discharge temperature of a compressor or the motor coil temperature of an electric motor, a temperature sensor needs to be installed at the corresponding location; however, from the viewpoint of problems related to a complex configuration and space, as well as increased cost due to a higher number of components, methods for estimating these temperatures on the basis of other parameters have been proposed in sensorless configurations.

For example, Japanese Unexamined Patent Application, Publication No. 2006-291878, titled "CONTROL METHOD AND CONTROLLER FOR ELECTRIC COMPRESSOR", discloses a method of obtaining a motor coil temperature by performing calculation using a discharge pressure of an electric compressor, electric motor rotational speed, and input current from an electric-motor driver.

CITATION LIST

Patent Literature

{PTL 1} Japanese Unexamined Patent Application, Publication No. 2006-291878

SUMMARY OF INVENTION

Technical Problem

However, in the technology disclosed in PTL 1 mentioned above, because the parameters used for calculating the motor coil temperature are not parameters that are directly influenced by the temperature, there are situations in which the influence of disturbances, such as, for example, the high-temperature environment in the vehicle etc., is not taken into consideration. In other words, although the technology disclosed in PTL 1 can deal with such a high-temperature environment in the vehicle etc. during normal operation by using correction values etc. that are obtained experimentally in advance, the technology cannot deal with events such as an abnormal increase in the outside air temperature, abnormal heat generation, and so forth, by means of temperature correction and may fail to take such events into consideration.

The present invention has been conceived in light of the above-described circumstances, and it provides an air conditioning apparatus that is capable of obtaining a motor coil temperature of an electric motor and a discharge temperature of a compressor and that is capable of suppressing increases in volume and cost of the apparatus without additionally provided temperature detection means.

In addition, another object of the present invention is to provide an air conditioning apparatus that is capable of achieving more effective estimations of the motor coil temperature of an electric motor and the discharge temperature of a compressor to perform more suitable overheating protection.

Solution to Problem

In order to solve the problem described above, the present invention employs the following solutions.

A first aspect of the present invention is an air conditioning apparatus comprising a control unit and a refrigerating cycle including an electric compressor that compresses gas refrigerant, a condenser that condenses high-pressure gas refrigerant by exchanging heat with outside air, an expansion valve that converts high-temperature, high-pressure liquid refrigerant into low-temperature, low-pressure liquid refrigerant, and an evaporator that vaporizes the low-temperature, low-pressure liquid refrigerant by exchanging heat with outside air, wherein the electric compressor is an inverter-integrated electric compressor that integrally includes a compressor, an electric motor that drives the compressor, and an inverter including a temperature detection unit that detects the temperature in the vicinity of a semiconductor switching device, and the control unit estimates a discharge temperature of the compressor on the basis of a detected temperature of the inverter, a rotational speed of the compressor, and a motive force of the compressor.

According to the air conditioning apparatus of the first aspect of the present invention, because the discharge temperature of the compressor is estimated on the basis of the detected temperature in the vicinity of the semiconductor switching device in the inverter, and a temperature parameter is used as the parameter used for the estimation calculation, even in the event of an abnormal increase in outside air temperature, abnormal heat generation, and so forth, it is possible to perform more effective estimation of the discharge temperature of the compressor. In addition, it is possible to suitably perform overheating protection by reducing the compressor rotational speed or stopping the compressor when the compressor discharge temperature exceeds a set threshold value. Note that a temperature detection unit conventionally provided for performing overheating protection of the semiconductor switching device may be used as the temperature detection unit in the inverter, and there is no need to install an additional temperature detection unit.

In the air conditioning apparatus described above, the control unit may be configured so as to estimate the discharge temperature of the compressor on the basis of a correlation of respective pressure loading characteristics for the detected temperature of the inverter, for the motive force of the compressor, and for the discharge temperature of the compressor in the refrigerating cycle.

According to such a configuration, because the discharge temperature of the compressor is estimated on the basis of the correlation of the pressure loading characteristic for the inverter detected temperature in a refrigerating cycle at the set compressor rotational speed, the pressure loading characteristic for the compressor power in a refrigerating cycle at the set compressor rotational speed, and the pressure loading characteristic for the compressor discharge temperature in a refrigerating cycle at the set compressor rotational speed, it is possible to realize more effective estimation and to perform more suitable overheating protection.

A second aspect of the present invention is an air conditioning apparatus comprising a control unit and a refrigerating cycle including an electric compressor that compresses gas refrigerant, a condenser that condenses high-pressure gas refrigerant by exchanging heat with outside air, an expansion valve that converts high-temperature, high-pressure liquid refrigerant into low-temperature, low-pressure liquid refrigerant, and an evaporator that vaporizes the low-temperature, low-pressure liquid refrigerant by exchanging heat with outside air, wherein the electric compressor is an inverter-integrated electric compressor that integrally includes a compressor, an electric motor that drives the compressor, and an inverter including a temperature detection unit that detects temperature in the vicinity of a semiconductor switching device, and the control unit estimates a motor coil temperature of the electric motor on the basis of a detected temperature of the inverter, a rotational speed of the compressor, and a motive force of the compressor.

According to the air conditioning apparatus of the second aspect of the present invention, because the motor coil temperature of the electric motor is estimated on the basis of the detected temperature in the vicinity of the semiconductor switching device in the inverter, and the detected temperature of the inverter is used as the parameter used for the estimation calculation, even in the event of an abnormal increase in outside air temperature, abnormal heat generation, and so forth, it is possible to perform more effective estimation of the motor coil temperature.

In addition, it is possible to suitably perform overheating protection by reducing the compressor rotational speed or stopping the compressor if, for example, the estimated motor coil temperature exceeds the set threshold value. Note that a temperature detection unit conventionally provided for performing overheating protection of the semiconductor switching device may be used as the temperature detection unit in the inverter, and so there is no need to install an additional temperature detection unit.

In the air conditioning apparatus described above, the control unit may be configured so as to estimate the motor coil temperature of the electric motor on the basis of correlation of respective pressure loading characteristics for the detected temperature of the inverter, for the motive force of the compressor, and for the motor coil temperature of the electric motor in the refrigerating cycle.

According to such a configuration, because the motor coil temperature of the electric motor is estimated on the basis of the correlation of the pressure loading characteristic for the inverter detected temperature in a refrigerating cycle at the set compressor rotational speed, the pressure loading characteristic for the compressor power in a refrigerating cycle at the set compressor rotational speed, and the pressure loading characteristic for the motor coil temperature in a refrigerating cycle at the set compressor rotational speed, it is possible to realize more effective estimation and to perform more suitable overheating protection.

In the air conditioning apparatus described above, the temperature detection unit may be arranged at a position corresponding to a region from a midstream region to a downstream region of a refrigerant flow flowing through the electric compressor.

Because the temperature detection unit is arranged at a position corresponding to a region from the midstream region to the downstream region of the refrigerant flow flowing through the electric compressor, even in the event of an abnormal temperature rise due to a malfunction of the electric motor, it is possible to reliably reflect that event in estimation of the motor coil temperature of the electric motor or the discharge temperature of the compressor, and to perform more suitable overheating protection.

In the air conditioning apparatus described above, the control unit may determine the occurrence of refrigerant leakage on the basis of the rotational speed of the compressor and the motive force of the compressor.

According to such a configuration, the occurrence of refrigerant leakage is determined on the basis of the compressor rotational speed and the compressor power, and, for example, if the compressor power is lower than a prescribed threshold value when the compressor rotational speed is greater than a prescribed compressor rotational speed, it is determined that refrigerant leakage (refrigerant leakage out of the system) is occurring, and the compressor is stopped; by doing so, it is possible to prevent the discharge temperature of the compressor from being increased because of a low-gas state.

In the air conditioning apparatus described above, the occurrence of a frosting may be determined on the basis of the detected temperature of the inverter.

Because the occurrence of frosting is determined on the basis of the detected temperature of the inverter, it is possible to prevent the compressor from being damaged due to frosting of the evaporator by increasing the compressor rotational speed when, for example, the detected temperature of the inverter is lower than a predetermined threshold value, and by stopping the compressor if no improvement is seen within a predetermined period.

Advantageous Effects of Invention

According to the present invention, because a discharge temperature of a compressor or a motor coil temperature of an electric motor is estimated on the basis of the temperature detected in the vicinity of a semiconductor switching device in an inverter, an advantage is afforded in that, even in the event of an abnormal increase in the outside air temperature, abnormal heat generation, and so forth, it is possible to perform more effective estimation of the discharge temperature of a compressor or the motor coil temperature and to perform suitable overheating protection.

DESCRIPTION OF EMBODIMENTS

First Embodiment

An air conditioning apparatus according to a first embodiment of the present invention will be described below with reference to the drawings.

Figure 1:
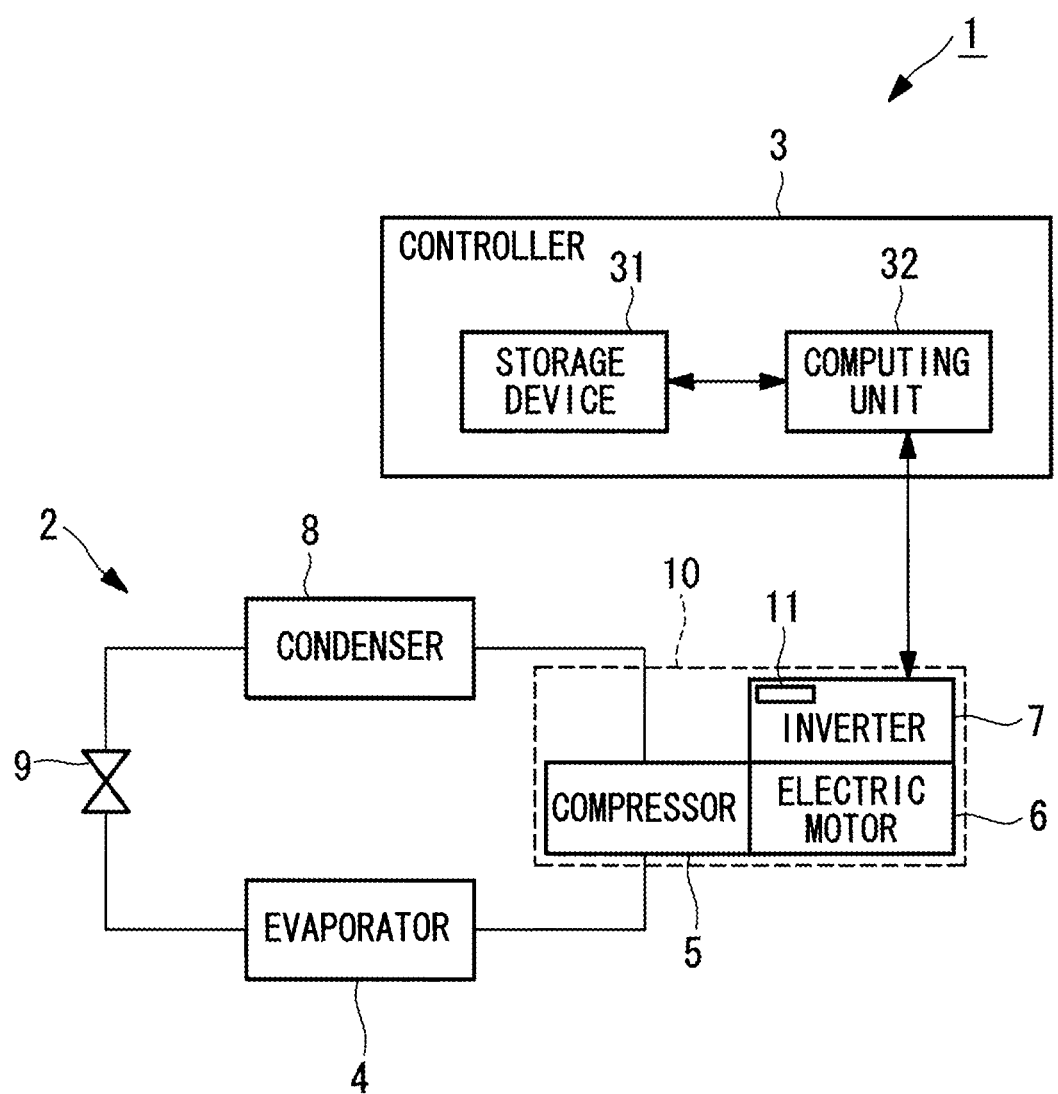
FIG. 1 is a diagram showing the configuration of an air conditioning apparatus according to a first embodiment of the present invention.

FIG. 1 is a diagram showing the configuration of an air conditioning apparatus according to the first embodiment of the present invention. In this figure, an air conditioning apparatus 1 according to this embodiment is provided with a refrigerating cycle 2 and a controller 3 as main components.

For example, the refrigerating cycle 2 supplies low-temperature, low-pressure liquid refrigerant to an evaporator 4 and is provided with a compressor 5, a condenser 8, and an expansion valve 9. The compressor 5 compresses low-temperature, low-pressure gas refrigerant, which has been evaporated in the evaporator 4 by removing heat within a vehicle cabin, and sends high-temperature, high-pressure gas refrigerant to the condenser 8, and the compressor 5 is driven by motive force from an electric motor 6. In addition, the condenser 8 is installed, for example, at a front section of an engine compartment and cools the high-temperature, high-pressure gas refrigerant supplied from the compressor 5 with outside air, thereby condensing and liquefying the gas refrigerant. The thus-liquefied refrigerant is sent to a receiver (not shown) where it is subjected to gas-liquid separation, and thereafter, is sent to the expansion valve 9 in the form of high-temperature, high-pressure liquid refrigerant. In this expansion valve 9, the high-temperature, high-pressure liquid refrigerant is decompressed and expanded to become low-temperature, low-pressure liquid (atomized) refrigerant, and this low-temperature, low-pressure liquid refrigerant is supplied to the evaporator 4.

The rotational speed of the electric motor 6 is variably controlled, in a continuous or stepwise manner, by varying the electric power supplied from inverter 7. By changing the rotational speed of the electric motor 6, the refrigerant discharge capacity of the compressor 5 is changed, the circulating amount (flow rate) of the refrigerant circulating through the refrigerating cycle 2 is adjusted, and the cooling capacity of the evaporator 4 (the cooling capacity of the refrigerating cycle 2) is controlled.

In addition, the controller 3 is provided with at least a storage device 31 and a computing unit 32. The computing unit 32 is realized with a CPU, a microprocessor MPU, or the like. During normal operation, the computing unit 32 of the controller 3 sets the rotational speed of the compressor 5 in accordance with a setting instruction from a control panel (not shown) and various kinds of detected data in the refrigerating cycle 2 (pressure at the low-pressure side etc.) and controls the rotational speed of the electric motor 6 via the inverter 7.

In addition, in this embodiment, the above-described compressor 5, the electric motor 6 that drives the compressor 5, and the inverter 7 are integrated into one unit, thereby constituting a so-called inverter-integrated electric compressor 10. Here, the inverter 7 is provided with a temperature sensor 11 that detects the temperature in the vicinity of semiconductor switching devices (power devices such as IGBTs etc.). Because integration of an inverter into an electric compressor causes the temperature environment to become very severe, the temperature sensor 11 is the same as one conventionally provided for overheating protection of semiconductor switching devices.

Next, the schematic configuration of the inverter-integrated electric compressor 10 used in the air conditioning apparatus 1 according to this embodiment and installation of the temperature sensor that detects the temperature of semiconductor switching devices in the inverter 7 will be described with reference to FIGS. 2 and 3. In this description, FIG. 2 is a partial longitudinal sectional view illustrating the inverter-integrated electric compressor 10, with an inverter-accommodating portion 61 thereof cut away, and FIG. 3 is a plan view illustrating, in outline, the placement of power semiconductor switching devices 74 (IGBTs etc.) and the temperature sensor 11 in the inverter 7 of the inverter-integrated electric compressor 10.

Figure 2:
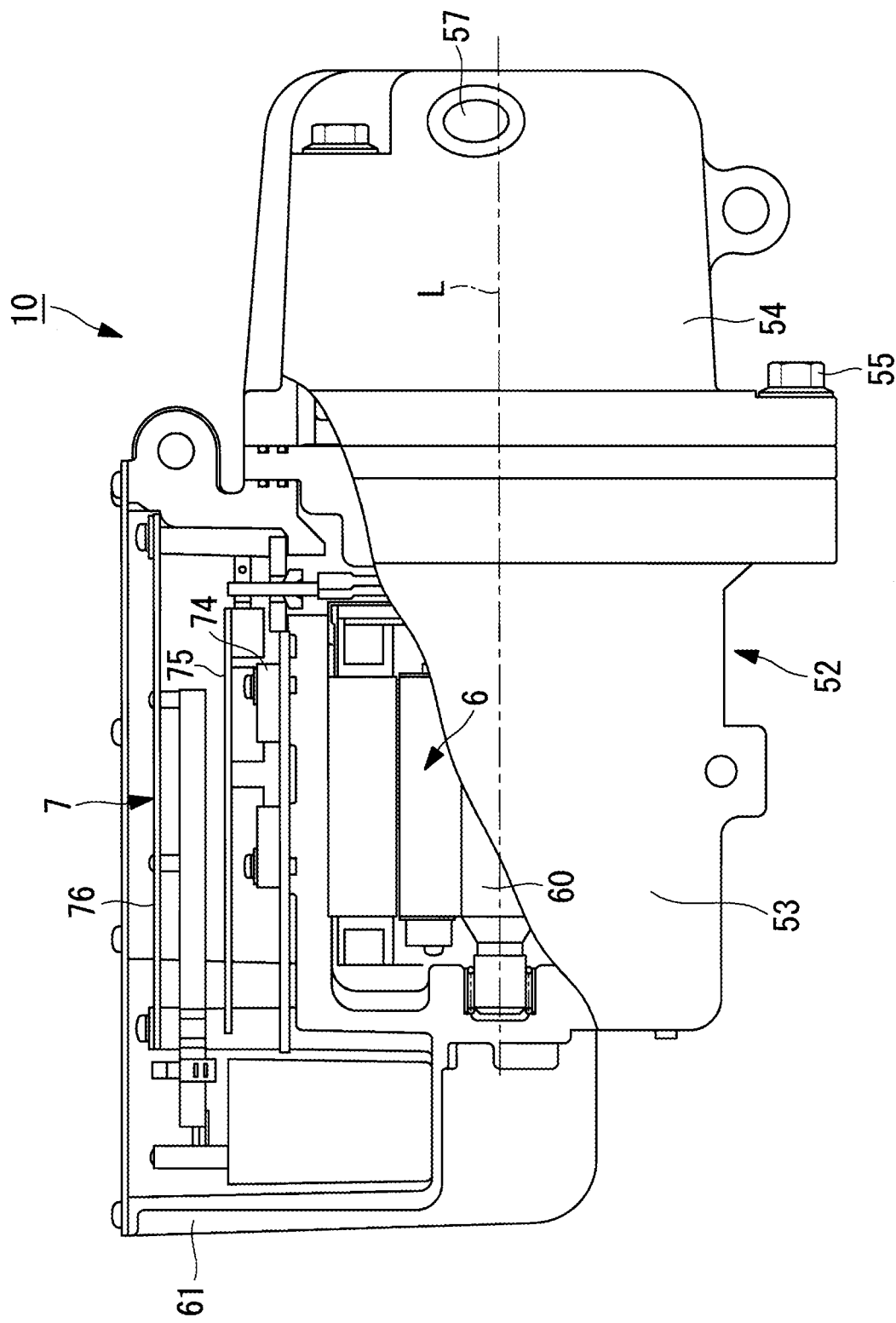
FIG. 2 is a partial longitudinal sectional view illustrating an inverter-integrated electric compressor, with an inverter-accommodating portion thereof cutaway.
Figure 3:
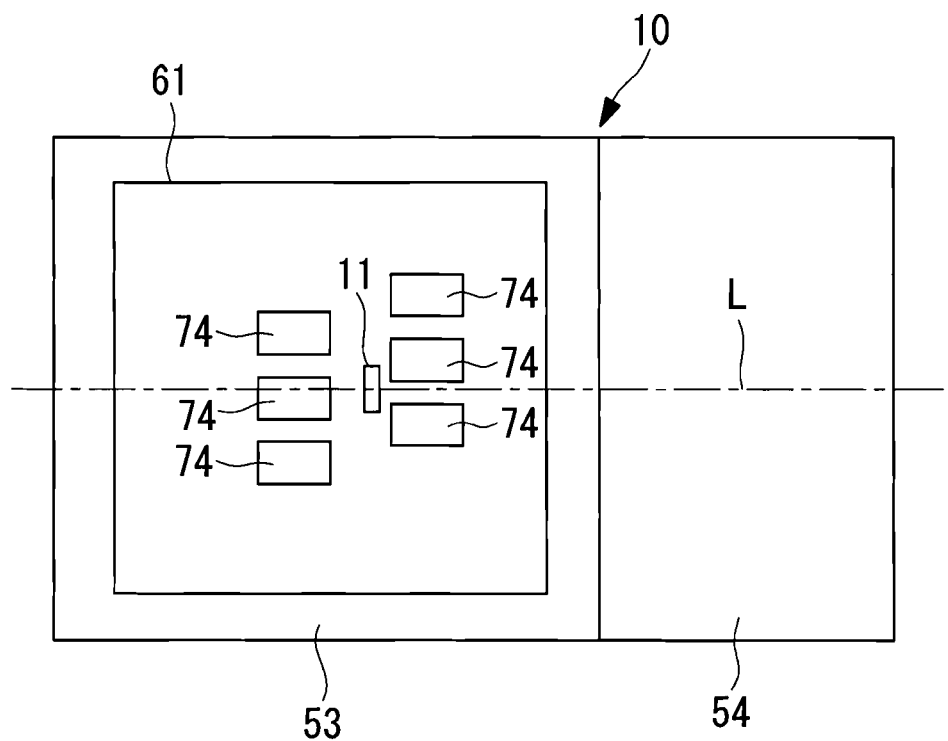
FIG. 3 is a plan view illustrating, in outline, an arrangement of power semiconductor switching devices and a temperature sensor in an inverter of an inverter-integrated electric compressor.

In FIG. 2, the inverter-integrated electric compressor 10 is provided with a housing 52 that forms an outer shell thereof. The housing 52 is formed by integrally fastening together a motor housing 53, in which the electric motor 6 is accommodated, and a compressor housing 54, in which a compressor mechanism (not shown) is accommodated, with bolts 55. The motor housing 53 and the compressor housing 54 are pressure-resistant containers made by aluminum die casting using aluminum alloy.

The electric motor 6 and the compressor mechanism (not shown), which are built into the above-described housing 52, are connected via a motor shaft 60 and are configured such that the compressor mechanism is driven by the rotation of the electric motor 6. A refrigerant intake port (not shown) is provided at one side of the motor housing 53 (left side in FIG. 2), and low-temperature, low-pressure refrigerant gas sucked into the motor housing 53 through this refrigerant intake port flows in the vicinity of the electric motor 6 along the direction of a motor axis L (from the left to right in FIG. 2), and thereafter, is sucked into and compressed by the compressor mechanism. The inverter-integrated electric compressor 10 is configured such that a high-temperature, high-pressure refrigerant gas, which has been compressed by the compressor mechanism, is discharged into the compressor housing 54, and thereafter, is sent outside from a discharge port 57 provided at one side of the compressor housing 54 (right side in FIG. 2).

In addition, the box-shaped inverter-accommodating portion 61 is integrally formed above the outer peripheral portion of the motor housing 53. FIG. 2 shows a partial longitudinal sectional view in which the inverter-accommodating portion 61 is cut away. The inverter-accommodating portion 61 has a box-shaped structure, which is surrounded by surrounding walls of a predetermined height and has an open top, and the top opening thereof is sealed with a cover member that is fixed with screws, with a sealing material (not shown) being interposed therebetween. In this configuration, two power-supply-cable outlet ports are provided at one side surface of the inverter-accommodating portion 61, and a high-voltage power supply and the inverter 7 installed in the inverter-accommodating portion 61 are connected thereto via two power supply cables.

The inverter 7 installed in the inverter-accommodating portion 61 is provided with a power circuit board 75 on which are mounted six power semiconductor switching devices 74 (power devices such as IGBTs etc.), as well as a power system control circuit (not shown), a high-voltage component (not shown), and so forth for operating these devices; a control board (printed circuit board) 76 on which are mounted a control circuit, a communication circuit (not shown), and so forth, having low-voltage devices, such as CPU; and so forth.

As shown in outline in the plan view of FIG. 3, the six power semiconductor switching devices 74 in the inverter 7 are arranged in two rows in the direction of the motor axis L, each having three units arrayed in the direction orthogonal to the direction of the motor axis L. In this two-row arrangement, the positional displacement in the direction orthogonal to the direction of the motor axis L is for convenience of the layout design.

In addition, the temperature sensor 11 is arranged in the vicinity of the substantially central portion of the region where the six power semiconductor switching devices 74 are arranged. The temperature sensor 11 detects the ambient temperature in the vicinity of the power semiconductor switching devices 74 and sends the detected temperature data to the controller 3 (FIG. 1) via a communication system. It is preferable that the temperature sensor 11 be arranged at a position in the vicinity of the power semiconductor switching devices 74 and a position corresponding to a region from the midstream region to the downstream region of a refrigerant flow flowing through the inverter-integrated electric compressor 10. This is because it is possible to better reflect an abnormal temperature rise due to malfunction of the electric motor 6 in the detected temperature data by arranging the temperature sensor 11 further on the downstream side.

Figure 4:
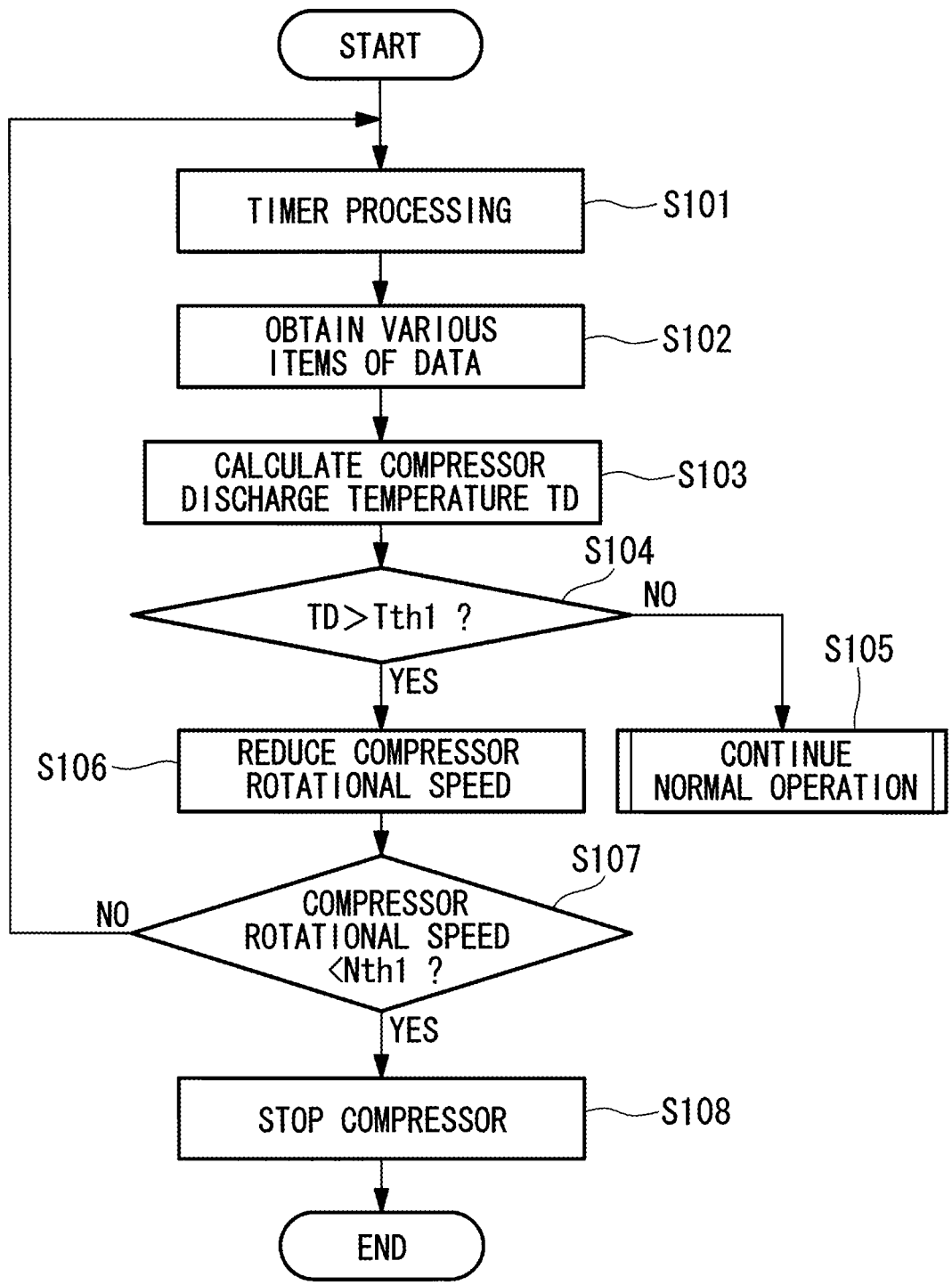
FIG. 4 is a flowchart of operation control of an air conditioning apparatus according to a first embodiment of the present invention.
Figure 5:
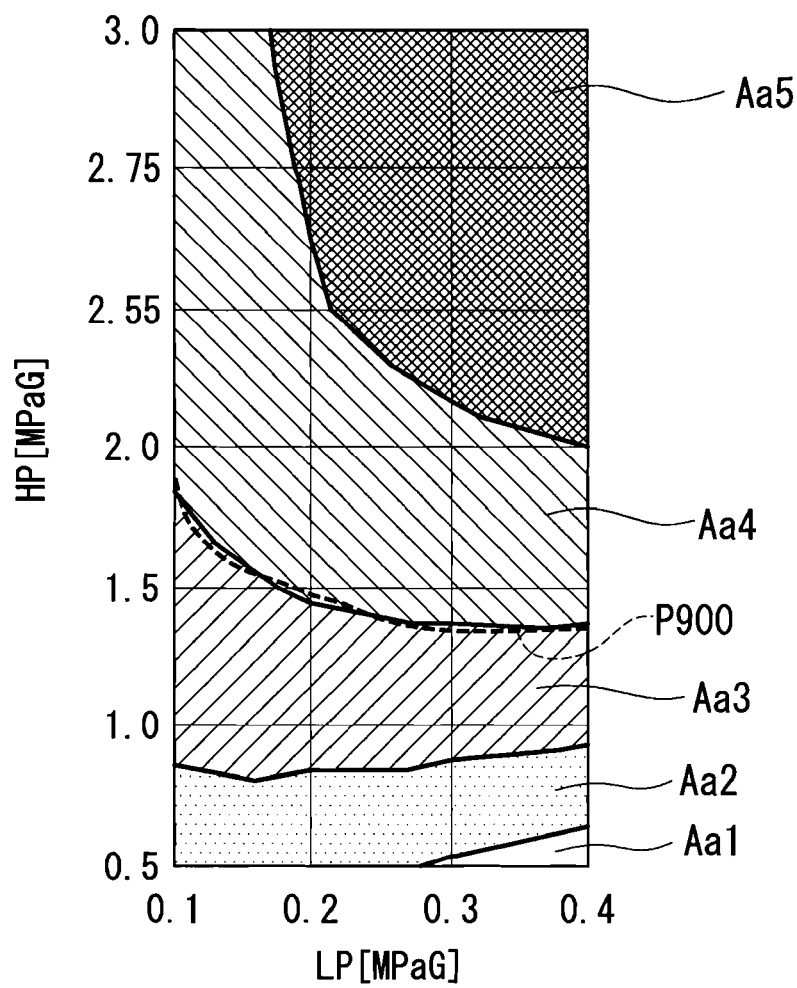
FIG. 5 is a diagram illustrating a pressure loading characteristic for inverter temperature at a prescribed compressor rotational speed in a refrigerating cycle.
Figure 6:
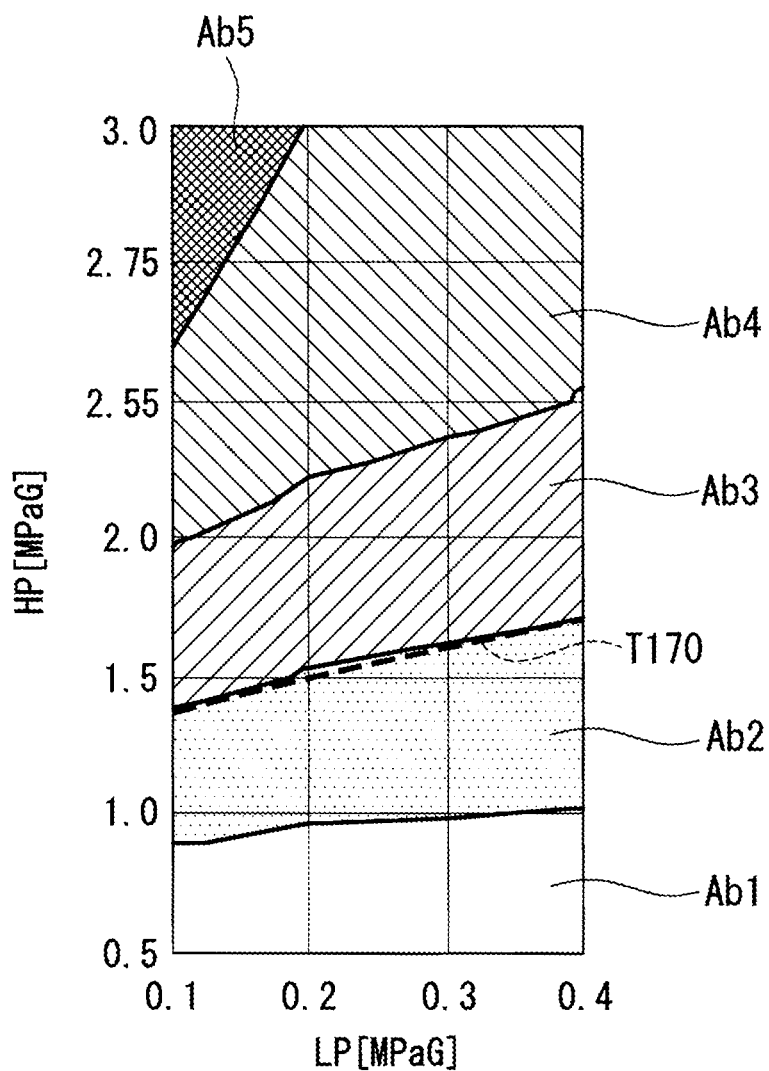
FIG. 6 is a diagram illustrating a pressure loading characteristic for compressor power at a prescribed compressor rotational speed in a refrigerating cycle.
Figure 7:
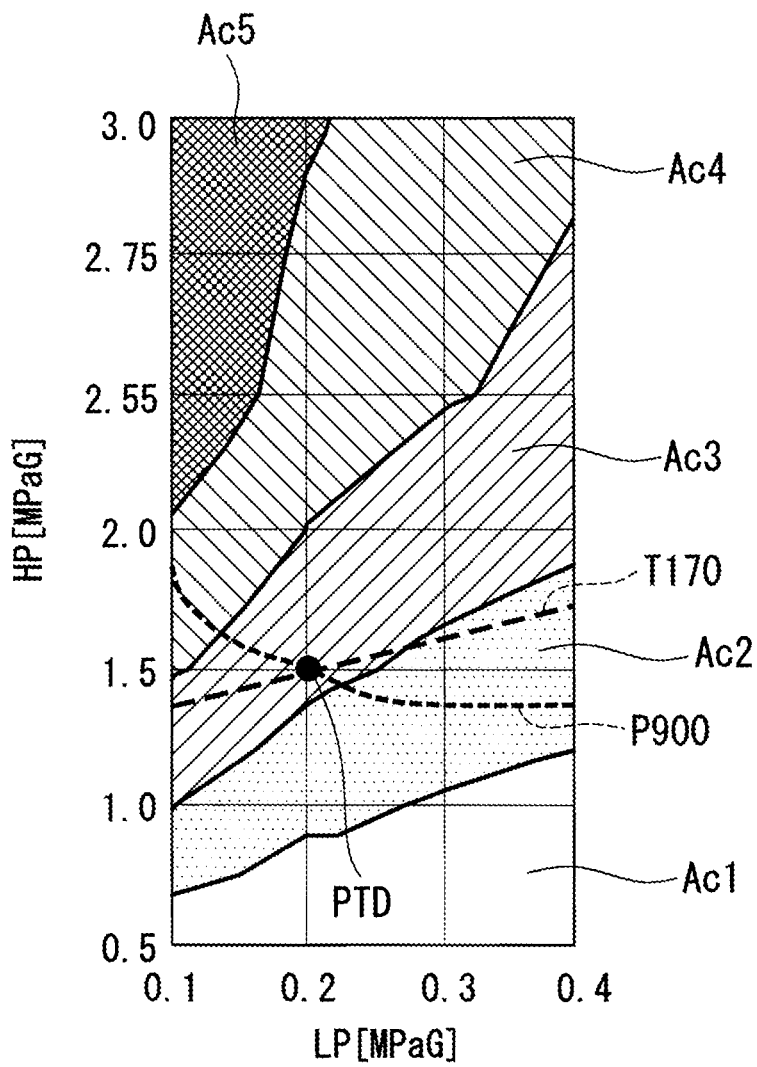
FIG. 7 is a diagram illustrating a pressure loading characteristic for compressor discharge temperature at a prescribed compressor rotational speed in a refrigerating cycle.

Next, estimation of the discharge temperature of the compressor 5 and operation control in accordance with the estimated discharge temperature in the air conditioning apparatus 1 according to this embodiment will be described with reference to FIGS. 4 to 7. FIG. 4 is a flowchart of operation control of the air conditioning apparatus 1 according to the first embodiment, and FIGS. 5 to 7 are diagrams illustrating examples of various pressure loading characteristics used in estimation of the compressor discharge temperature.

A processing sequence related to operation control of the air conditioning apparatus 1 according to this embodiment is executed by the computing unit 32 of the controller 3 as a program. In addition, the processing sequence, which will be described below, is performed repeatedly at predetermined time intervals, and in a timer processing in Step S101, the predetermined time intervals are clocked with a timer and the processing sequence is started.

First of all, various items of data are obtained (Step S102). Specifically, the ambient temperature in the vicinity of the power semiconductor switching devices 74 is obtained in the form of detected IGBT temperature data from the temperature sensor 11 in the inverter 7, and the compressor rotational speed and the compressor power set by the computing unit 32 at the present time are obtained.

Next, a compressor discharge temperature TD is calculated by applying the various items of data to a prescribed arithmetic expression (Step S103). The calculation method in this step will be described below.

Next, the calculated compressor discharge temperature TD is compared with a prescribed compressor discharge temperature threshold Tth1 (Step S104). If the compressor discharge temperature TD is equal to or lower than the compressor discharge temperature threshold Tth1, the process proceeds to Step S105, where the normal operation is continued, and if the compressor discharge temperature TD is higher than the compressor discharge temperature threshold Tth1, the process proceeds to Step S106, where the compressor rotational speed is reduced.

Next, the reduced compressor rotational speed is compared with a prescribed minimum rotational speed Nth1 (Step S107). If the compressor rotational speed is equal to or greater than the minimum rotational speed Nth1, the process returns to Step S101 (timer processing), and if the compressor rotational speed is lower than the minimum rotational speed Nth1, it is determined that the compressor discharge temperature TD has reached an abnormally overheated state, and the process proceeds to Step S108, where the compressor 5 is stopped.

Next, the calculation method of the compressor discharge temperature TD performed in Step S103 in FIG. 4 will be described with reference to FIGS. 5 to 7. In this embodiment, the compressor discharge temperature TD is estimated on the basis of the correlation of a pressure loading characteristic for the inverter detected temperature in a refrigerating cycle, a pressure loading characteristic for the compressor power in a refrigerating cycle, and a pressure loading characteristic for the compressor discharge temperature in a refrigerating cycle, which are set in the storage device 31 of the controller 3 in advance.

The respective characteristics are described with reference to FIGS. 5 to 7.

FIG. 5 is a diagram illustrating an example of the pressure loading characteristic for the compressor power when the compressor rotational speed is 1800 [rpm], and the distribution of the compressor power is shown with separate regions Aa1 to Aa5 on a map of pressure at the high-pressure side HP [MPaG] versus pressure at the low-pressure side LP [MPaG].

FIG. 6 is a diagram illustrating an example of the pressure loading characteristic for the inverter detected temperature when the compressor rotational speed is 1800 [rpm], and the distribution of the IGBT temperature (the inverter detected temperature) is shown with separate regions Ab1 to Ab5 on a map of pressure at the high-pressure side HP [MPaG] versus pressure at the low-pressure side LP [MPaG].

FIG. 7 is a diagram illustrating an example of the pressure loading characteristic for the compressor discharge temperature when the compressor rotational speed is 1800 [rpm], and the distribution of the compressor discharge temperature is shown with separate regions Ac1 to Ac5 on a map of pressure at the high-pressure side HP [MPaG] versus pressure at the low-pressure side LP [MPaG].

The respective pressure loading characteristics described above are prepared according to the level of the compressor rotational speed and are stored in the storage device 31 in association with the respective compressor rotational speed.

In the respective pressure loading characteristics described above, although possible ranges of the respective parameters are divided into five levels to show the distribution, the number of division is not limited thereto. In addition, information may be held not only as a map but as an arithmetic expression related to the correlation.

In Step S102 in FIG. 4, the computing unit 32 of the controller 3 obtains data of the IGBT temperature, the compressor power, and the compressor rotational speed and extracts, from the storage device 31, the pressure loading characteristic for the compressor power, the pressure loading characteristic for the inverter detected temperature, and the pressure loading characteristic for the compressor discharge temperature corresponding to the obtained compressor rotational speed.

Subsequently, the computing unit 32 draws a curve that corresponds to the obtained IGBT temperature on the extracted pressure loading characteristic for the inverter detected temperature and draws a curve that corresponds to the compressor power on the pressure loading characteristic for the compressor power. If there is no corresponding value, the distribution curve is interpolated to draw a curve.

Subsequently, the computing unit 32 draws the curve drawn on the pressure loading characteristic for the inverter detected temperature and the curve drawn on the pressure loading characteristic for the compressor power on the pressure loading characteristic for the compressor discharge temperature in a superimposed manner and estimates the compressor discharge temperature TD at that time by reading out the compressor discharge temperature at the intersection of the two curves.

In Step S102 in FIG. 4, for example, if 70 [° C.], 900 [W], and 1800 [rpm] are obtained as the IGBT temperature, the compressor power, and the compressor rotational speed, respectively, the computing unit 32 extracts the pressure loading characteristic for the compressor power, the pressure loading characteristic for the inverter detected temperature, and the pressure loading characteristic for the compressor discharge temperature corresponding to the compressor rotational speed of 1800 [rpm] from the storage device 31. As a result, the respective pressure loading characteristics shown in FIGS. 5 to 7 are extracted.

Subsequently, the computing unit 32 draws a curve P900 corresponding to 900 [W] on the pressure loading characteristic for the compressor power shown in FIG. 5 and a curve TI70 corresponding to 70 [° C.] on the pressure loading characteristic for the inverter detected temperature shown in FIG. 6, and furthermore, the computing unit 32 draws the curve P900 drawn on FIG. 5 and the curve TI70 drawn on FIG. 6 on the pressure loading characteristic for the compressor discharge temperature shown in FIG. 7, in a superimposed manner, obtains an intersection PTD of the two characteristics, and reads out the compressor discharge temperature TD at the intersection PTD on the distribution. As a result, the discharge temperature TD of the compressor is estimated to be 105 [° C.].

Accordingly, it is possible to estimate the compressor discharge temperature TD by reading out the compressor discharge temperature at the intersection of the compressor power characteristic curve and the IGBT temperature characteristic curve on the pressure loading characteristic for the compressor discharge temperature. In addition to the case where the distribution characteristic is used as described above, for example, it is possible to obtain the discharge temperature TD of the compressor by performing the computation by determining these three types of pressure loading characteristics etc. by using an arithmetic expression etc. in advance and by applying various items of data to the arithmetic expression.

As described above, according to the air conditioning apparatus 1 of this embodiment, the discharge temperature TD of the compressor 5 is estimated on the basis of the temperature detected with the temperature sensor 11 in the vicinity of the semiconductor switching devices 74 in the inverter 7. Accordingly, because the temperature detected in the vicinity of the semiconductor switching devices 74 in the inverter 7 is used as the parameter in the estimation calculation, it is possible to perform more effective estimation of the compressor discharge temperature TD even in the event of an abnormal increase in the outside air temperature, abnormal heat generation, and so forth.

In addition, because the compressor rotational speed is reduced when the compressor discharge temperature TD is higher than the set threshold value Tth1 and the compressor is stopped when the compressor rotational speed is lower than the minimum rotational speed Nth1, it is possible to perform suitable overheating protection. Note that a temperature sensor conventionally provided for performing overheating protection of the semiconductor switching devices 74 may be used as the temperature sensor 11 in the inverter 7, and so, there is no need to install an additional sensor.

Second Embodiment

Next, an air conditioning apparatus according to a second embodiment of the present invention will be described. Although the compressor discharge temperature TD is estimated in the first embodiment described above, a motor coil temperature TM is estimated instead of the compressor discharge temperature TD in this embodiment. A method of estimating the motor coil temperature TM, which is the difference from the first embodiment, and operation control in accordance with the estimated motor coil temperature TM will be described below with reference to FIGS. 8 and 9.

Figure 8:
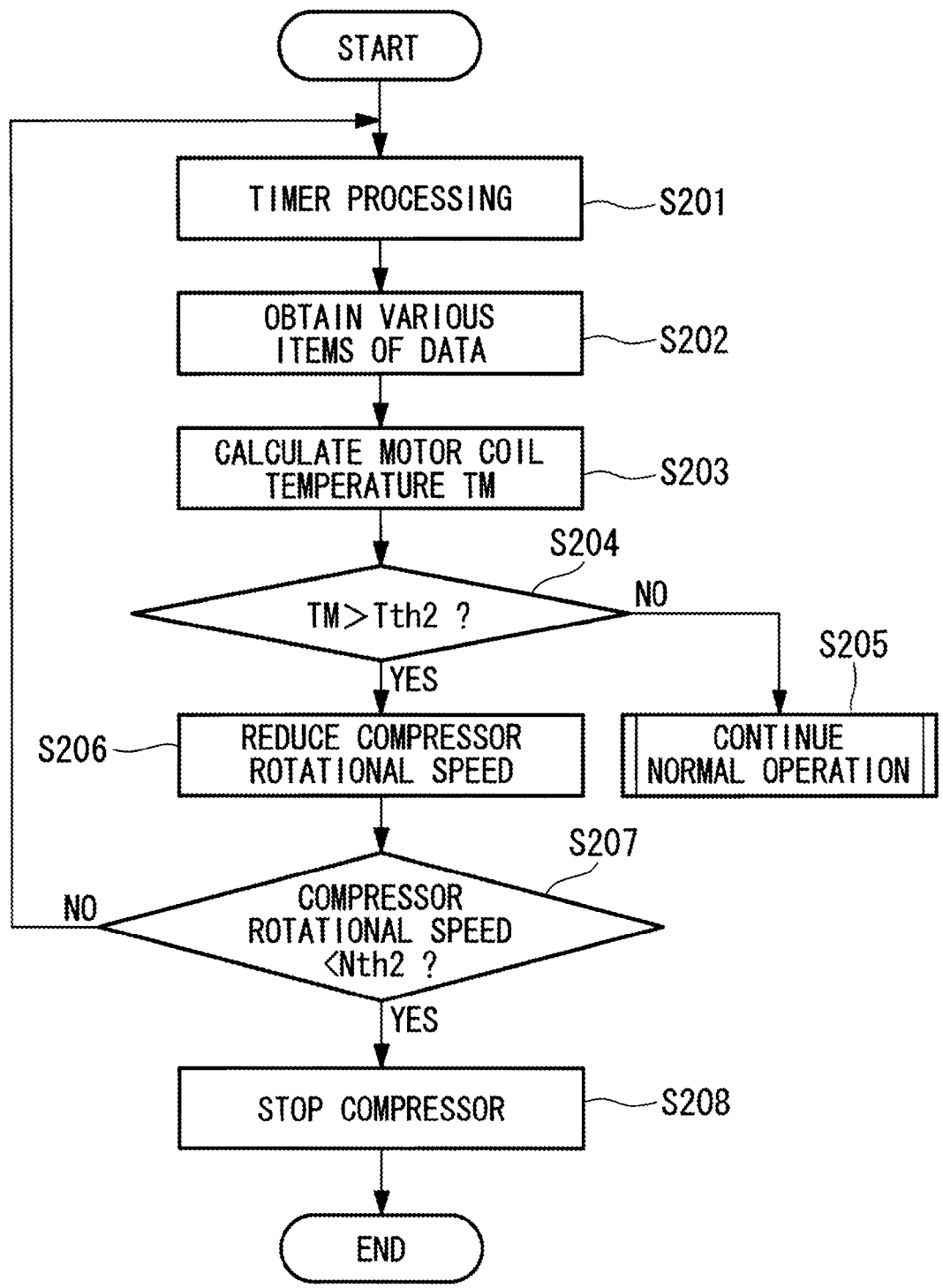
FIG. 8 is a flowchart of operation control of an air conditioning apparatus according to a second embodiment of the present invention.
Figure 9:
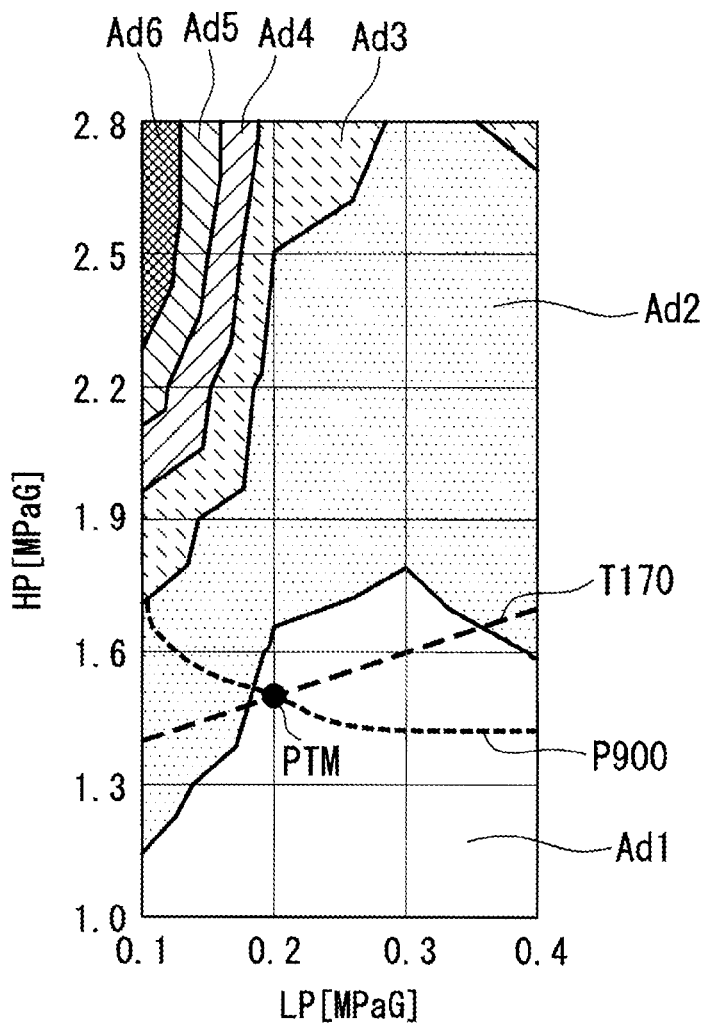
FIG. 9 is a diagram illustrating a pressure loading characteristic for motor coil temperature of an electric motor at a prescribed compressor rotational speed in a refrigerating cycle.

FIG. 8 is a flowchart of operation control of the air conditioning apparatus 1 according to the second embodiment, and FIG. 9 is a diagram showing an example of the pressure loading characteristic for the motor coil temperature TM of the electric motor 6 when the compressor rotational speed is 1800 [rpm].

A processing sequence shown in FIG. 8 is executed as a program by the computing unit 32 of the controller 3. In addition, the processing sequence, which will be described below, is performed repeatedly at a predetermined time intervals, and in timer processing in Step S201, the predetermined time intervals are clocked with a timer and the processing sequence is started.

First of all, various items of data are obtained (Step S202). Specifically, the ambient temperature in the vicinity of the power semiconductor switching devices 74 is obtained in the form of the detected IGBT temperature data from the temperature sensor 11 in the inverter 7, and the compressor rotational speed and the compressor power set by the computing unit 32 at the present time are obtained.

Next, the motor coil temperature TM of the electric motor 6 is calculated by applying the various items of data to a prescribed arithmetic expression (Step S203). The calculation method in this step will be described below.

Next, the calculated motor coil temperature TM is compared with a prescribed motor coil temperature threshold Tth2 (Step S204). If the motor coil temperature TM is equal to or lower than the motor coil temperature threshold Tth2, the process proceeds to Step S205, where the normal operation is continued, and if the motor coil temperature TM is higher than the motor coil temperature threshold Tth2, the process proceeds to Step S206, where the compressor rotational speed is reduced.

Next, the reduced compressor rotational speed is compared with a prescribed minimum rotational speed Nth2 (Step S207). If the compressor rotational speed is equal to or greater than the minimum rotational speed Nth2, the process returns to Step S201 (timer processing), and if compressor rotational speed is lower than the minimum rotational speed Nth2, it is determined that the motor coil temperature of the electric motor 6 has reached an abnormally overheated state, and the process proceeds to Step S208, where the compressor 5 is stopped.

Next, the calculation method of the motor coil temperature TM of the electric motor 6 performed in Step S203 in FIG. 8 will be described with reference to FIG. 9.

In this embodiment, the motor coil temperature TM of the electric motor 6 is estimated on the basis of the correlation of the pressure loading characteristic for the inverter detected temperature, the pressure loading characteristic for the compressor power, and the pressure loading characteristic for the motor coil temperature of the electric motor 6 that are stored in the storage device 31 of the controller 3 in advance.

Because the pressure loading characteristic for the inverter detected temperature and the pressure loading characteristic for the compressor power used herein are the same as those in the above-described first embodiment, a description thereof will be omitted.

FIG. 9 is an example of the pressure loading characteristic for the motor coil temperature when the compressor rotational speed is 1800 [rpm], and the distribution of the motor coil temperature is shown with separate regions Ad1 to Ad6 on the map of pressure at the high-pressure side HP [MPaG] versus pressure at the low-pressure side LP [MPaG].

Similarly to the pressure loading characteristic for the inverter detected temperature and the pressure loading characteristic for the compressor power, such a pressure loading characteristic for the motor coil temperature is also prepared accordingly to the level of the compressor rotational speed.

In Step S202 in FIG. 8, the computing unit 32 of the controller 3 obtains data of the IGBT temperature, the compressor power, and the compressor rotational speed, and extracts the pressure loading characteristic for the compressor power, the pressure loading characteristic for the inverter detected temperature, and the pressure loading characteristic for the motor coil temperature corresponding to the obtained compressor rotational speed, respectively, from the plurality of pressure loading characteristics stored in the storage device 31.

Subsequently, the computing unit 32 draws a curve that corresponds to the obtained IGBT temperature on the extracted pressure loading characteristic for the inverter detected temperature and draws a curve that corresponds to the obtained compressor power on the pressure loading characteristic for the compressor power. Next, the computing unit 32 draws the curve drawn on the pressure loading characteristic for the inverter detected temperature and the curve drawn on the pressure loading characteristic for the compressor power on the pressure loading characteristic for the motor coil temperature, in a superimposed manner, and estimates the motor coil temperature at that time by reading out the motor coil temperature at the intersection of the two curves.

In Step S202 in FIG. 8, for example, if 70 [° C.], 900 [W], and 1800 [rpm] are obtained as the IGBT temperature, the compressor power, and the compressor rotational speed, respectively, the computing unit 32 draws the curve P900 corresponding to 900 [W] on the pressure loading characteristic for the compressor power shown in FIG. 5 and the curve TI70 corresponding to 70 [° C.] on the pressure loading characteristic for the inverter detected temperature shown in FIG. 6, and then draws the curve P900 drawn in FIG. 5 and the curve TI70 drawn in FIG. 6 on the pressure loading characteristic for the motor coil temperature shown in FIG. 9 in a superimposed manner, obtains an intersection PTM of the two characteristics, and reads out the motor coil temperature at the intersection PTM on the distribution. As a result, the motor coil temperature is estimated to be 70 [° C.].

Accordingly, it is possible to estimate the motor coil temperature of the electric motor 6 to be 70 [° C.] by reading out the motor coil temperature at the intersection of the compressor power characteristic curve and the IGBT temperature characteristic curve on the pressure loading characteristic for the motor coil temperature. In addition to the case where the distribution characteristic is used as described above, for example, it is possible to obtain the discharge temperature TD of the compressor by performing the computation by determining these three types of pressure loading characteristics etc. by using an arithmetic expression etc. in advance and by applying various items of data to the arithmetic expression.

As described above, according to the air conditioning apparatus of this embodiment, the motor coil temperature TM of the electric motor 6 is estimated on the basis of the temperature detected with the temperature sensor 11 in the vicinity of the semiconductor switching devices 74 in the inverter 7. Accordingly, because the temperature detected in the vicinity of the semiconductor switching devices 74 in the inverter 7 is used as the parameter in the estimation calculation, it is possible to perform more effective estimation of the motor coil temperature TM of the electric motor 6 even in the event of an abnormal increase in the outside air temperature, abnormal heat generation, and so forth.

In addition, because the compressor rotational speed is reduced when the motor coil temperature TM of the electric motor 6 is higher than the set threshold value Tth2 and the compressor is stopped when the compressor rotational speed is lower than the minimum rotational speed Nth2, it is possible to perform suitable overheating protection. Note that a temperature sensor conventionally provided for the overheating protection of the semiconductor switching devices 74 may be used as the temperature sensor 11 in the inverter 7, and so, there is no need to install an additional sensor.

In addition, as also described in the first embodiment, it is possible to reflect an abnormal temperature rise due to malfunction of the electric motor 6 in the detected temperature data and to perform suitable overheating protection by arranging the temperature sensor 11 in the vicinity of the power semiconductor switching devices 74 and at a position corresponding to a region from the midstream region to the downstream region of the refrigerant flow flowing through the inverter-integrated electric compressor 10.

Third Embodiment

Next, an air conditioning apparatus according to a third embodiment of the present invention will be described. The configuration of the air conditioning apparatus of this embodiment is similar to that of the first embodiment (FIGS. 1 to 3), and a description thereof will be omitted. In addition, operation control of the air conditioning apparatus 1 of this embodiment determines that refrigerant leakage has occurred on the basis of the compressor rotational speed and the compressor power, and this is performed in addition to the operation control in the first embodiment or the second embodiment.

Figure 10:
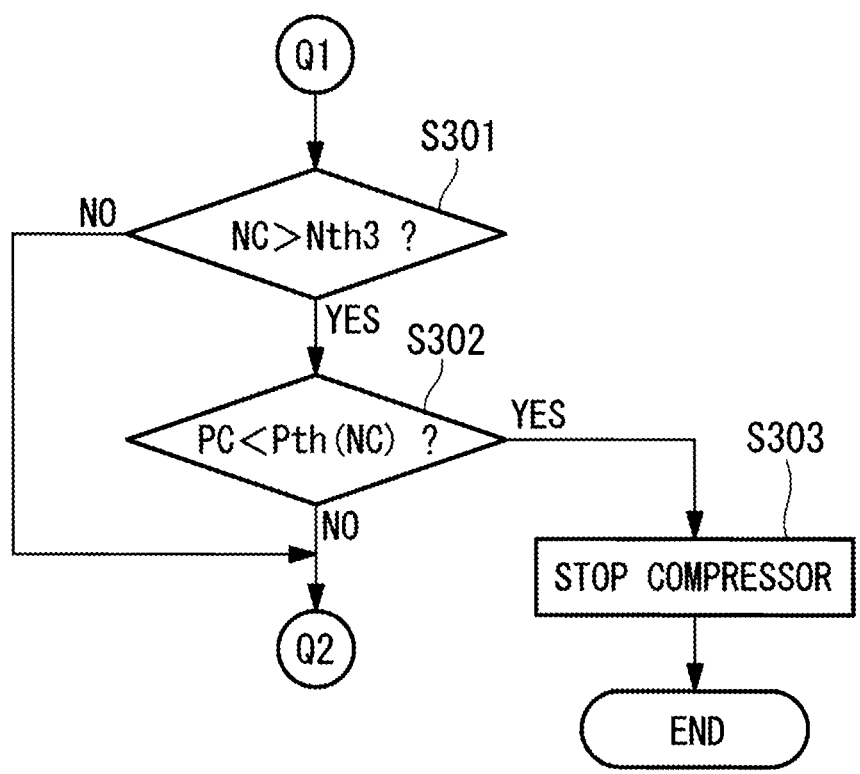
FIG. 10 is a flowchart of operation control of an air conditioning apparatus according to a third embodiment of the present invention.

FIG. 10 is a flowchart of the operation control of the air conditioning apparatus 1 according to the third embodiment. Processing steps between a node Q1 and a node Q2 in the figure are inserted after the step of obtaining the various items of data in the first embodiment or the second embodiment (Step S102 in FIG. 4 or Step S202 in FIG. 8).

First of all, an obtained compressor rotational speed NC is compared with a prescribed compressor rotational speed threshold value Nth3 (Step S301), and if the compressor rotational speed NC is lower than the compressor rotational speed threshold value Nth3, the process immediately returns to the processing in the first embodiment or the second embodiment.

In addition, if the compressor rotational speed NC is greater than the compressor rotational speed threshold value Nth3, a compressor power PC is compared with a prescribed compressor power threshold function value Pth(NC) (Step S302), and if the compressor power PC is equal to or greater than the compressor power threshold function value Pth (NC), the process immediately returns to the processing in the first embodiment or the second embodiment.

In addition, if the compressor power PC is lower than the compressor power threshold function value Pth(NC) in Step S302, it is determined that refrigerant leakage is occurring, and the process proceeds to Step S303, where the compressor 5 is stopped.

In the case where the amount circulating refrigerant is small, such as the case where the refrigerant is leaking out of the refrigerating cycle 2 and the amount of refrigerant in the refrigerating cycle 2 has become low, the motive force of the compressor 5 is lowered abnormally, and the discharge temperature of the compressor 5 increases because of the low-gas state. Therefore, if the motive force of the compressor 5 is lowered abnormally at the compressor rotational speed of a certain value or greater, it is determined that refrigerant leakage is occurring and the compressor 5 is stopped, thereby performing overheating protection of the discharge temperature.

Figure 11:
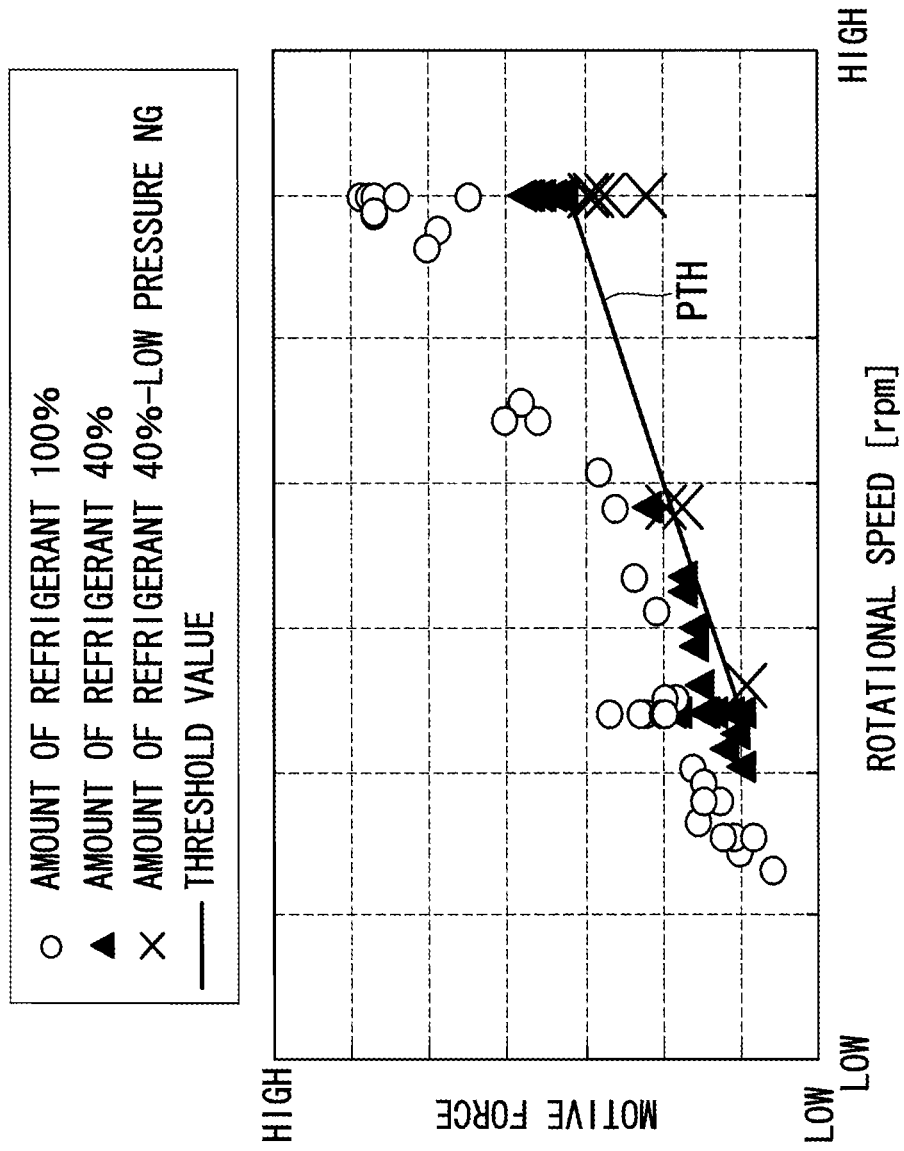
FIG. 11 is a diagram illustrating a compressor power versus compressor rotational speed characteristic.

FIG. 11 illustrates the compressor power characteristic for the compressor rotational speed and illustrates a compressor power threshold function PTH. In the example shown in FIG. 11, the compressor power threshold function PTH is set such that it is determined that the refrigerant leakage is occurring if the amount of refrigerant in the refrigerating cycle 2 is less than 40[%]. The compressor power threshold function value Pth(NC) used in Step S302 is obtained by substituting the compressor rotational speed NC into the compressor power threshold function PTH.

As described above, with the air conditioning apparatus according to this embodiment, because the occurrence of refrigerant leakage is determined on the basis of the compressor rotational speed and the compressor power, and if the compressor rotational speed NC is greater than the compressor rotational speed threshold value Nth3 and the compressor power PC is lower than the compressor power threshold function value Pth(NC), it is determined that refrigerant leakage (leakage of the refrigerant to the outside) is occurring and the compressor 5 is stopped, and therefore, it is possible to prevent the discharge temperature of the compressor 5 from being increased because of the low-gas state.

Fourth Embodiment

Next, an air conditioning apparatus according to a fourth embodiment of the present invention will be described. The configuration of the air conditioning apparatus according to this embodiment is similar to that of the first embodiment (FIGS. 1 to 3), and a description thereof will be omitted. In addition, operation control of the air conditioning apparatus 1 of this embodiment determines the occurrence of frosting on the basis of the detected temperature of the inverter (IGBT temperature), and thus is performed in addition to the operation control in the first embodiment or the second embodiment.

Frosting is a phenomenon in which moisture in the air freezes (frosts) on the evaporator 4 if the humidity is high and the cooling capacity is excessive. Frosting disturbs the air flow and reduces the amount of heat exchanged with the air. Therefore, the refrigerant, which normally returns to the compressor 5 after being subjected to the heat exchange with the air and evaporated, returns to the compressor 5 as a liquid refrigerant without being evaporated. The liquid refrigerant can wash off lubricating oil from sliding parts, leading to a risk of damaging the compressor 5.

In a situation where a large amount of liquid refrigerant returns to the compressor 5 when frosting occurs, heat generated by the power semiconductor switching devices 74 is more excessively cooled than in a normal situation with the latent heat of the liquid refrigerant. Therefore, in the case where the detected temperature of the inverter (IGBT temperature) is abnormally lower than the normal state, it is determined that the liquid refrigerant is returning to the compressor 5 and that frosting occurs.

Figure 12:
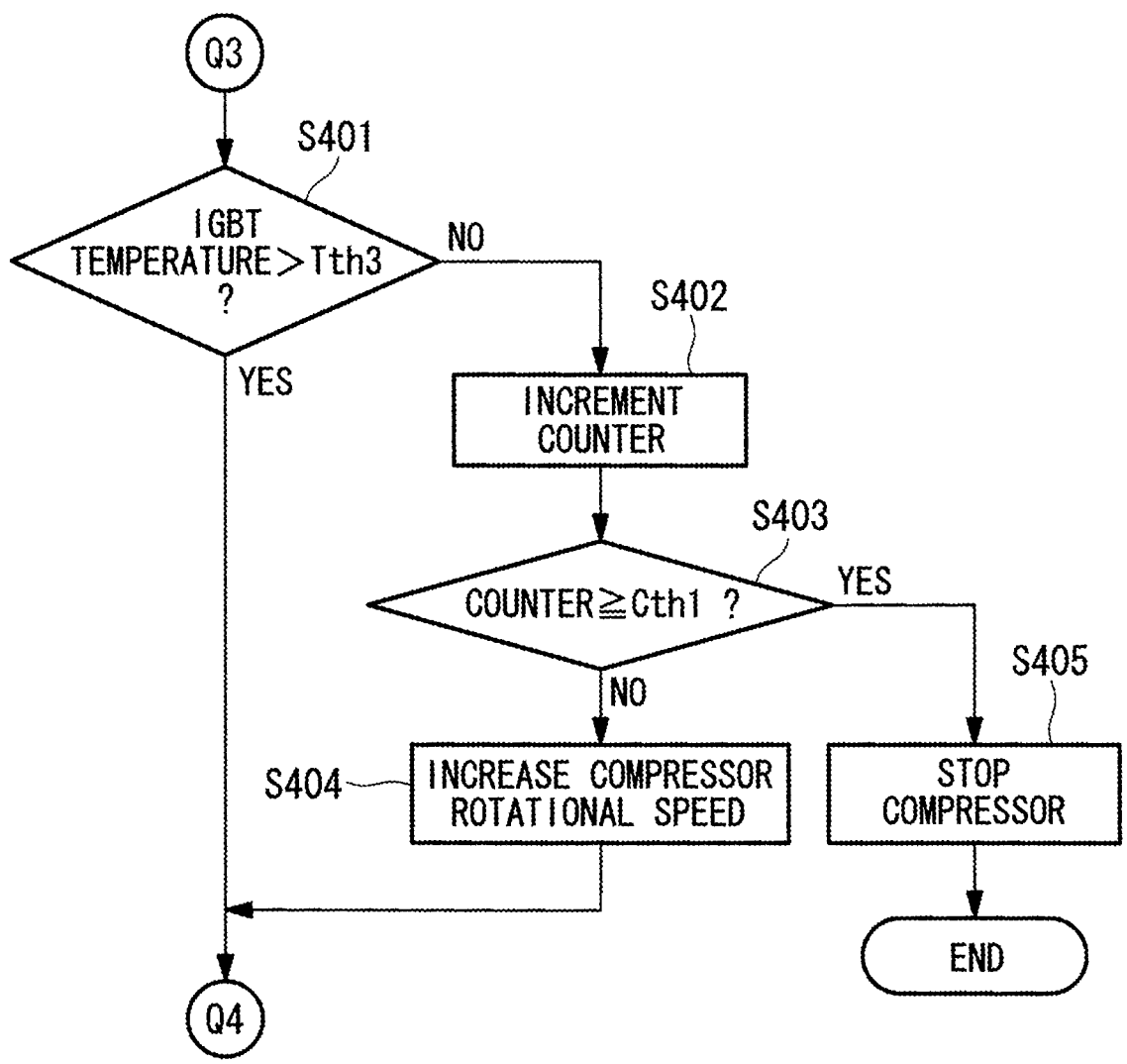
FIG. 12 is a flowchart of operation control of an air conditioning apparatus according to a fourth embodiment of the present invention.

FIG. 12 is a flowchart of operation control of the air conditioning apparatus 1 of the fourth embodiment. Processing steps between a node Q3 and a node Q4 in the figure are inserted after the step of obtaining the various items of data (Step S102 in FIG. 4 or Step S202 in FIG. 8) in the first embodiment or the second embodiment.

First of all, the IGBT temperature is compared with a prescribed IGBT temperature threshold value Tth3 (Step S401). If the IGBT temperature is higher than the IGBT temperature threshold value Tth3, the process immediately returns to the processing in the first embodiment or the second embodiment.

In addition, if the IGBT temperature is equal to or lower than the IGBT temperature threshold value Tth3, the process proceeds to Step S402, where a counter is incremented, and then, the counter value is compared with a predetermined count threshold value Cth1 (Step S403). Here, the counter continuously counts the number of times that the IGBT temperature is determined to be abnormally lowered, and the count threshold value Cth1 may be set in accordance with the intervals of the timer processing (Step S101 in FIG. 4 and Step S201 in FIG. 8).

If the counter value is smaller than the predetermined count threshold value Cth1, the compressor rotational speed is increased (Step S404), and the process immediately returns to the first embodiment or the second embodiment. In addition, if the counter value is equal to or greater than the predetermined count threshold value Cth1, it is determined that there will be no improvement, and the process proceeds to Step S405, where the compressor 5 is stopped.

As described above, with the air conditioning apparatus of this embodiment, because the occurrence of frosting is determined on the basis of the detected temperature of the inverter (IGBT temperature), and the compressor rotational speed is increased when the IGBT temperature becomes lower than the IGBT temperature threshold value Tth3 and the compressor 5 is stopped if no improvement is seen within a predetermined period, it is possible to prevent the compressor 5 from being damaged due to frosting of the evaporator 4.

REFERENCE SIGNS LIST 1 air conditioning apparatus
2 refrigerating cycle
3 controller (control means)
4 evaporator
5 compressor
6 electric motor
7 inverter
8 condenser
9 expansion valve
10 inverter-integrated electric compressor
11 temperature sensor (temperature detection means)
31 storage device
32 computing unit
52 housing
61 inverter-accommodating portion
74 semiconductor switching device
75 power circuit board
76 control board

The invention claimed is:

1. An air conditioning apparatus comprising a control unit and a refrigerating cycle including an electric compressor that compresses gas refrigerant, a condenser that condenses high-pressure gas refrigerant by exchanging heat with outside air, an expansion valve that converts high-temperature, high-pressure liquid refrigerant into low-temperature, low-pressure liquid refrigerant, and an evaporator that vaporizes the low-temperature, low-pressure liquid refrigerant by exchanging heat with outside air, wherein the electric compressor is an inverter-integrated electric compressor that integrally includes a compressor, an electric motor that drives the compressor, and an inverter including a temperature detection unit that detects temperature in the vicinity of a semiconductor switching device as a inverter temperature, the control unit comprises:
a storage part that stores
a first information indicated a first high-low pressure characterized of the compressor according to a motive force of the compressor,
a second information indicating a second high-low pressure characteristics of the compressor according to the inverter temperature,
a third information indicating a third high-low pressure characteristics according to a discharge temperature of the compressor; and
an arithmetic part configured to
obtain, from the first information, the first high-low pressure characteristics of the compressor that corresponds to a current motive force,
obtain, from the second information, the second high-low pressure characteristics of the compressor that corresponds to the inverter temperature detected by the temperature detection unit, and
specify the combination of the high pressure and low pressure of the compressor and second high-low pressure characteristics of the compressor,
specify the discharge temperature of the compressor that corresponds to the combination of the high pressure and low of the compressor fusing the third information,
and estimate the discharge temperature of the compressor.

2. An air conditioning apparatus according to claim 1, wherein the temperature detection unit is arranged at a position corresponding to a region from a midstream region to a downstream region of a refrigerant flow flowing through the electric compressor.

3. An air conditioning apparatus according to claim 1, wherein the control unit determines an occurrence of refrigerant leakage on a basis of the rotational speed of the compressor and the motive force of the compressor.

4. An air conditioning apparatus according to claim 1, wherein the control unit determines an occurrence of frosting on a basis of the inverter temperature.

5. The air conditioning apparatus according to claim 1, wherein a plurality of pieces of the first information, a plurality of pieces of the second information, and a plurality of pieces of the third information are associated with different compressor rotational speeds and are stored in the storage part, and
the arithmetic part extracts, from the storage part, the first information, the second information, and the third information according to a current rotational speed, and estimates the discharge temperature of the compressor using the extracted first information, the extracted second information, and the extracted third information.

* * * * *